United States Patent [19]

Kisbany

[11] 4,060,578
[45] Nov. 29, 1977

[54] METHOD OF FOAM-FILLING A TIRE CARCASS

[76] Inventor: Frederick N. Kisbany, 464 Lexington Road, Grosse Point Farms, Mich. 48236

[21] Appl. No.: 411,106

[22] Filed: Oct. 30, 1973

[51] Int. Cl.$^2$ .................... B29D 27/00; B60C 7/00
[52] U.S. Cl. ................... 264/46.6; 264/469; 264/55
[58] Field of Search ............... 264/45, 55, 94, 45.7, 264/46.6, 46.9

[56] References Cited

U.S. PATENT DOCUMENTS

| 2,404,636 | 7/1946 | Humphrey | 264/55 |
| 2,751,627 | 6/1956 | Lindemann | 264/55 |
| 3,022,810 | 2/1962 | Lambe | 152/310 |
| 3,396,773 | 8/1968 | Alderfer | 152/313 |

Primary Examiner—James B. Lowe
Attorney, Agent, or Firm—Peter A. Taucher; John E. McRae; Nathan Edelberg

[57] ABSTRACT

A method of making a foam-filled tire wherein a resilient elastomeric foam is formed and cured within a tire carcass while the carcass interior is at super-atmospheric pressure. Such superatmospheric pressure is believed to support the cell walls against internally generated gas (blowing) pressures, thereby stabilizing the cells at higher than usual internal cell pressure. The foaming operation is carried out so that the foam only partially fills the carcass interior. After the elastomeric foam has been cured the tire carcass interior is depressurized down to the pressure to be used in service. During the depressurization process the internal cell pressures cause the cells to expand and further fill the tire interior space. The depressurization process is carried out after the elastomeric foam has been cured, i.e. when the cell walls have attained their full potential strength. Accordingly, the post-cure expansion of the cell walls does not result in cell wall rupture, even though the cell walls are relatively thin. The thin cell walls resulting from this process are advantageous in that they reduce the required mass of foam-forming elastomer, thereby achieving improvements in respect to lower raw material costs, shorter cure times, lesser non-useful dead loads, lesser heat build-up and foam degradation during service, and lesser tendency toward wheel imbalance.

3 Claims, 3 Drawing Figures

METHOD OF FOAM-FILLING A TIRE CARCASS

The invention described herein may be manufactured, used, and licensed by or for the Government for governmental purposes without payment to me of any royalty thereon.

BACKGROUND OF THE INVENTION

Various proposals have been advanced to provide a vehicle tire with bullet-proof capabilities. In one such proposal an elastomeric reslient foam is formed in situ within a conventional tire carcass after the carcass has been mounted on a wheel. The elestomeric foam is formed to have a substantial number of closed cells, so that a bullet, fragment or projectile can pass through the carcass and foam without rupturing any cells other than those directly in the projectile's trajectory. The intent is that the tire will be able to continue to support the vehicle, using the undamaged cells for support purposes.

The foams used in foam-filled tires are preferably internally pressurized, since conventional non-pressurized or open-celled foam materials are unduly compressed by externally applied loads. For example, conventional open-celled flexible foams can be compressed to at least one-half of their original dimensions by the application of load forces in the neighborhood of 2 p.s.i. In general, the compression characteristics of conventional open-celled foam materials tend to make them unsuitable as the sole resilient filling material in tire carcasses, since such foams would tend to remain in the compressed state under the relatively high loads imposed by most vehicles.

To alleviate the deficiencies of conventional foams, it has been proposed to internally pressurize the cells by suitably regulating the conditions of the foam-forming process; see for example U.S. Pat. No. 3,022,810 issued to D. M. Lambe on Feb. 27, 1962.

In the process of forming a resilient flexible foam, the polymerization or vulcanization reaction and the gas-forming reaction proceed simultaneously. The character of the product is determined at least partly by the relative rates of the two reactions. As polymerization or vulcanization proceeds the viscosity of the liquid or unvulcanized solid phase changes so as to influence its surface tension. The surface tension largely determines the resistance to bubble development. Gas release can be accomplished when the gaseous reaction product quantitatively exceeds the point of supersaturation in the liquid or unvulcanized solid phase; the gas then comes out of solution to deform the liquid or solid phase into the form of tiny bubbles, similar to the commonly seen soap bubbles produced by blowing air through a pipe. The tiny bubbles propagate into larger bubbles or cells against the resistance offered by the phase that forms the cell walls. As explained by Calvin J. Benning in his book, "PLASTIC FOAMS: THE PHYSICS AND CHEMISTRY OF PRODUCT PERFORMANCE AND PROCESS TECHNOLOGY, VOL 1 — CHEMISTRY AND PHYSICS OF FOAM FORMATION" published by John Wiley & Sons in 1969, at page 130, at least some of the smaller cells rupture to form larger cells and/or to combine with the larger cells.

The permissible radius of a cell is said to be directly proportional to the surface tension of the liquid or unvulcanized solid phase and inversely proportional to the pressure difference across the membrane cell wall. Therefore, with a given surface tension the development of an increasing internal gaseous pressure will cause the bubble to burst when the cell reaches some predetermined radius or size. If such bursting is not controlled the formed cells may contain an excessive number of open cells, which is undesired in a bullet-proof tire.

Under conventional practice, if the cells are to remain internally pressurized, as desired for a foam-filled tire, the cell radius must be limited to a small value; otherwise the cells will burst and become depressurized. The small size cells must have relatively thick walls to contain the internal gaseous pressure (i.e. thick in relation to the cell volume). These considerations have conventionally led to the use of high density foams. Such high density foams impose a weight penalty on the vehicle, as well as a sacrifice in riding quality. The vehicle load is transmitted to a large extent through the cell walls rather than through pressure variations of the contained gas.

In conventional foam-forming processes the cell walls must be of sufficient strength, while in the viscous pre-cured state, to contain or resist the internal gas pressures. Unfortunately the cell wall material does not possess its highest potential strength while in this state; i.e. the highest strength of the cell wall is not attained until after polymerization or vulcanization and cure of the final foam. The lack of strength possessed by the cell wall during bubble development means that the blowing pressure must be kept low. The end result is that the cell wall, rather than the entrapped gas, must carry the major part of any load imposed on the tire. This means that more foam material is required than would be the case if the foam was developed so that the entrapped gas carried the major part of the load.

As previously noted, the employment of large quantities of foam-filling elastomers in a tire is disadvantageous because the foam adds to the weight of the tire and therefore adds to the dead load that must be moved by the power source. For example, one tire carcass weighed approximately 27 pounds empty and 90 pounds when filled with foam.

Large masses of foam-forming elastomers are also undesirable since they contribute to increased rolling resistance, hence to heat build-up and potential degradation of the foam. Additionally, such large foamed elastomeric masses tend to increase raw material costs and curing time. Large foamed elastomer masses may also tend to increase the centrifugally imposed stresses on the tire carcass, thereby tending toward greater wheel imbalance and shortened tire life.

SUMMARY OF THE INVENTION

An object of the present invention is to provide a foam-filled tire having a lessened quantity of elastomeric foam, thereby overcoming at least some of the previously noted disadvantages.

This object is accomplished by forming and curing the foam in a highly pressurized atmosphere so that the pressure differential across the bubble wall during cure is decreased (as compared to conventional practice), thereby permitting formation and curing of a more highly pressurized bubble. The mass of foam-forming elastomer is chosen so that the cured foam only partially fills the tire carcass. Subsequently, the carcass interior is partially vented or depressurized so that the internally pressurized cells of the cured foam expand to further fill the tire interior. Such delayed expansion takes place after the foam has cured, when the cell walls have achieved their maximum strength. The delayed expansion may be viewed as a post-cure step in development of reduced cell wall thickness and larger cell volume containing the blowing gas at service pressure.

It is believed that the method of foam-generating suggested by applicant will permit the use of lessened quantities of foam-forming elastomers because each cell is formed with a thinner wall and larger cell radius. Post-cure expansion of the foam will take place when the cell walls have their full strength; hence, the relatively thin cell walls will not rupture in spite of their thinness. The end result is to enable the use of lesser quantities of foam-forming elastomers.

THE PRIOR ART

The following patents are believed to be representative of the prior art:

| U.S. Pat. No. | Patentee | Issued |
|---|---|---|
| 2,902,072 | F. C. Reuter | Sept. 1, 1959 |
| 3,022,810 | D. M. Lambe | Feb. 27, 1962 |
| 3,348,597 | E. P. Goldberg | Oct. 24, 1967 |
| 3,381,735 | T. D. Talcott | May 7, 1968 |
| 3,605,848 | F. G. Lombardi | Sept. 20, 1971 |

THE DRAWINGS

FIG. 1 is a semi-schematic sectional view taken through an apparatus and tire intended for use in practicing the method of this invention.

FIG. 2 is a sectional view taken through the apparatus and tire of FIG. 1, showing the tire after the foam has been formed and cured.

FIG. 3 is a sectional view taken in the same direction as FIG. 2, showing the foam-filled tire after separation from the apparatus, and after depressurization to the pressure to be used in service.

Figure 1:
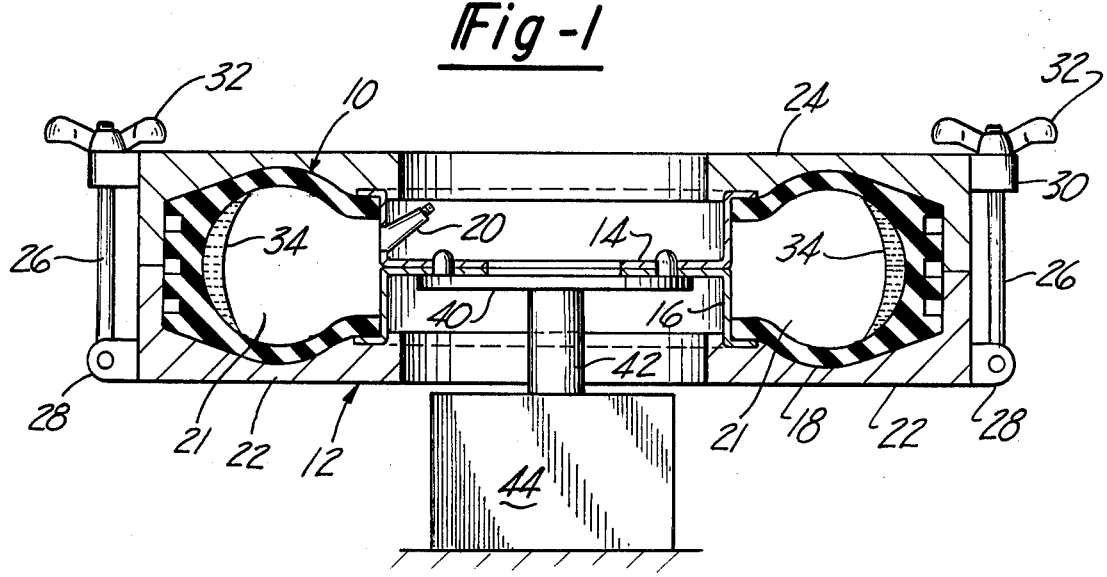
FIG. 1 illustrates a tire 10 disposed within a high pressure-resistant container 12. The function of container 12 is to restrain the tire against outward bulging or bursting when the tire is pressurized prior to foaming and curing.

The tire comprises a metal wheel disc 14 having a conventional rim 16 for mounting a conventional tire carcass 18. A gas filler check valve 20 is located on rim 16 for pressurizing the carcass interior from an exterior high gas pressure source (not shown). A valve stem within valve 20 can be depressed to vent or depressurize the carcass interior space 21.

The container 12 comprises two annular cavity elements As shown in the illustrative drawing, each bolt 26 is pivotally connected to an ear 28 carried by cavity element 22. The threaded end of each bolt extends through a bifurcated lug 30 carried by cavity element 24; a nut 32 is threaded onto each bolt to lock the cavity elements together on the tire. The type of container locking means can, of course, be varied as desired or necessary.

Tire carcass 18 is shown in FIG. 1 as containing a charge 34 of a liquid unvulcanized elastomeric foam formulation. The liquid formulation may be charged into the tire carcass interior prior to fixation of valve 20 on the wheel rim 16; the valve may be installed later. Alternately the liquid may be charged into the tire carcass through another opening in rim 16 (not shown), and that opening closed by a suitable plug.

As seen in FIG. 1, the liquid formulation 34 is evenly distributed around the inside peripheral surface of the tire carcass. An even distribution of the formulation may be achieved by rotating the tire in a horizontal plane around its central axis, as by means of the illustrated pedestal 40 carried on the shaft 42 of the rotational power source 44. Centrifugal forces generated by the rotational movement effect a relatively uniform thickness of formulation 34 during the curing operation, thereby contributing to a uniform foam density and a dynamically balanced tire.

The exact chemical make-up of the elastomeric formulation 34 is at this time subject to experimentation. However, it is believed that the following formulation could be used:

| Ingredient | % Solids | Parts by Weight |
|---|---|---|
| Neoprene latex | 59 | 100 |
| petrolatum | 40 | 0–3 |
| zinc oxide | 60 | 7.5 |
| antioxidant | 60 | 2 |
| trialkyl thiourea emulsion | 55 | 2 |
| sodium dibutyldithio-carbamate | 50 | 1 |
| sodium alkyl sulfate | 20 | 1 |
| isocyanate | 100 | 10–25 |
| potassium silicofluride | 20 | 2 |

Formulation 34 may be charged into the tire before or after it has been located within the container 12. In any event, after formulation 34 is charged into the tire and after the tire is located within container 12, the tire is pressurized to a predetermined relatively high superatmospheric pressure, i.e. 300 p.s.i., well above (and based on) the pressure to be employed during service on the road. The confined and pressurized tire assembly is then rotated and heated. The rotating operation can be carried out with the illustrated power source 44. The heating operation can be carried out in various ways, as for example by locating the rotating assembly in a curing oven. A curing temperature in the neighborhood of 275° F. is believed satisfactory.

It is known that tires have been foam-filled, using foam ingredients in the form of unvulcanized neoprene sheets, as opposed to the illustrated liquid latex 34. Such sheets have been preheated to a tacky condition for adherence to the tire carcass inner surface at the location of liquid 34 shown in FIG. 1. The use of such tacky sheets is believed feasible, although the use of liquids is preferred because liquids can be readily distributed in a uniform fashion around the tire, as by means of rotational mechanism 44. If the tire is to operate at reasonably high speeds, above thirty miles per hour, the cured foam should be relatively uniformly distributed around the tire circumference to provide optimum dynamic balance.

Figure 2:
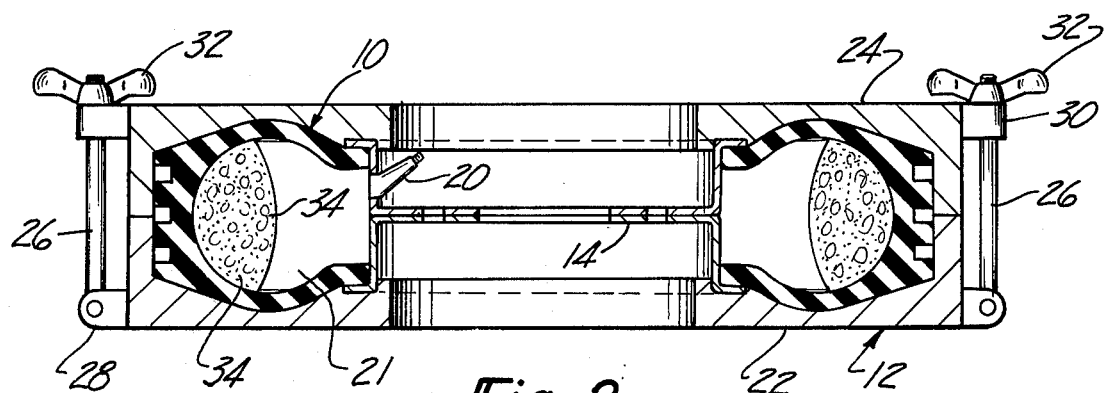

FIG. 2 illustrates the condition of the confined tire after removal from the heated chamber, i.e. after curing. As shown, the elastomer 34 is foamed to an increased volume that is greater than its initial volume but still less than the total volume of interior space 21. The FIG. 2 foam volume may be limited or determined by selecting the initial mass of elastomer formulation 34. Said means is based on the intended road service pressure of the particular tire.

After the assembly has been removed from the curing chamber the valve stem in valve 20 may be depressed to lower the space 21 pressure to the desired level to be used on the road. In some cases the road service pressure might be as low as 25 p.s.i. In other cases the road service pressure might be in the neighborhood of 70 p.s.i. Container 10 is left in a clamped condition on the tire until the tire is at or near its designated road service pressure.

Figure 3:
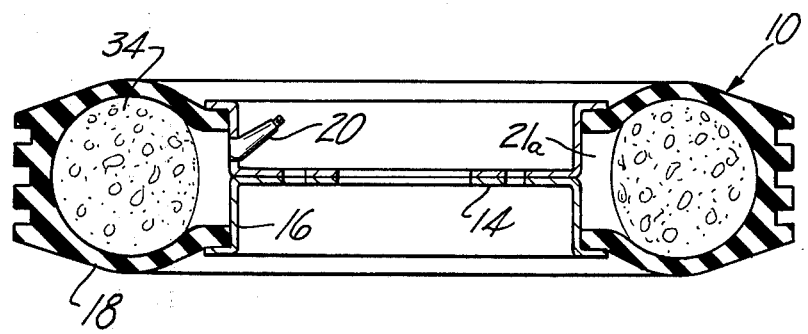

It is believed that during the depressurizing operation of interior space 21 the relatively high pressures prevailing in the cells of the elastomeric foam will further expand the foam to some higher volume such as shown in FIG. 3. As there shown, the foam fills the major portion of tire interior space 21. The percentage of space 21 unoccupied by foam will depend on what, if any, advantage is obtained by providing such an unoccupied annular space. It is not believed necessary in every case that the final foam volume be fully equivalent to the volume of space 21; if the elastomeric masses and operating pressures are suitably selected, a small pressurized zone 21a can be left near wheel rim 16 as shown in FIG. 3. Such a zone can be depressurized or vented, using valve 20, to provide the desired service pressure.

A feature of the invention is that the tire carcass interior space 21 is pressurized while the foam-forming elastomer ingredients polymerize and bubble (FIG. 2). It is believed that the pressurized atmosphere will act as an external reinforcement for the cell walls during the period while the gas is being released from solution to generate the bubbles, and that the gas pressure within the cells will be approximately that of the pressurized atmosphere. Presumably, as the external pressure is reduced to road service levels, the bubbles will be enabled to grow to larger than conventional size while still remaining closed. During the foaming operation, the formed cells will have equalized internal pressures that are well above road service pressures.

The pressurized bubbles developed by use of applicant's invention are believed to be distinguished from the relatively de-pressurized bubbles developed with most conventional prior art methods. Prior art practice has apparently been to polymerize and bubble at a relatively low pressure, e.g. normal atmospheric pressure or some pressure near the pressure to be used during service. Any pressurization of the cells under conventional practice has apparently been achieved by selecting the operating parameters (such as catalysts and/or temperatures) so that the polymerization reaction was permitted to advance sufficiently to develop a satisfactory cell wall strength before generated gas pressures were high enough to materially rupture the majority of the cells. Under such conditions the cells were presumably stabilized at some relatively low internal cell pressure.

In applicant's method of cell-formation the sought for high cell pressures during cure are initially resisted or contained by the pre-existing superatmospheric pressure in the tire carcass. Later, after the foam has been cured and the cell walls have reached their condition of highest strength, the pressures are reduced to achieve the post cure expansion denoted by FIG. 3. Since after curing the cell walls are relatively strong the post cure foam expansion operation does not rupture the cell walls. The cell walls are then relatively thin, but at the same time many times stronger than during the liquid or unvulcanized solid stage (initial bubble formation).

It is believed that by using the method of this invention it should be possible to substantially reduce the mass of foam-forming elastomer required to achieve a satisfactory foam-filled tire with a desired percentage of closed cells. The lesser elastomer masses should provide improvements as regards raw material costs, shorter cure times, lesser total dead load tire weight, and lesser heat build up during service.

The essential feature of the invention method is to foam and cure a relatively small mass of elastomer at a first superatmospheric pressure well above expected road service pressure, and to later effect a post cure depressurization down to road service pressure. No experimental use of the method has yet been accomplished; therefore it is not possible at this time to state the preferred pressures or elastomeric masses to be employed during the foaming and curing stage. However, it is presently contemplated that relatively high pressures, well above 100 p.s.i. will probably be necessary or desirable. In general, it is expected that the higher the foaming-curing pressure the less the mass of the foam-forming elastomer; i.e. the wet foam expansion will be relatively small and the post-cure dry foam expansion will be relatively great. Where large elastomer foam masses are particularly undesirable (e.g. very large size tires) it may be desirable during the foaming-curing stage to use still higher pressures.

The drawings show the use of a container 12 to retain the tire carcass against abnormal bulging or rupture during the foaming-curing stage. If the tire carcass has sufficient strength and the superatmospheric foaming pressures are sufficiently low it may be possible to dispense with the container.

I wish it to be understood that I do not desire to be limited to the exact details of construction shown and described for obvious modifications will occur to a person skilled in the art.

What is claimed is:

1. The method of making a foam-filled tire comprising the steps of:
    1. mounting a tire carcass on the rim of a wheel,
    2. introducing sufficient foam-forming elastomer into the tire carcass as would be capable of forming a foam only partially filling the carcass interior;
    3. pressuring the tire carcass interior to a relatively high superatmospheric pressure appreciably above the pressure to be employed within the tire at the time it is placed in service on the road,
    4. reacting the foam-forming ingredients while the carcass interior is at the afore-mentioned relatively high superatmospheric pressure to produce a cured foam that only partially fills the carcass interior; and
    5. later reducing the pressure within the tire interior space unoccupied by the foam to permit further expansion and to produce a final tire pressure that approximates expected normal road service pressure.

2. The method of claim 1 wherein the pressure-reducing step is carried out so that when the pressure is reduced down to normal road service pressure the foam will substantially completely fill the tire carcass interior.

3. The method of claim 1 wherein the foam-forming elastomer is introduced into the tire carcass in a liquid condition; the method further comprising the step of rotating the tire around the axis during the curing step to provide relatively uniform foam density around the tire circumference.

* * * * *